428-408 SR

1/31/84 XR 4,428,996

United States Patent [19]

Miyoshi et al.

[11] 4,428,996

[45] Jan. 31, 1984

[54] DIAPHRAGM FOR SPEAKER

[75] Inventors: Yasushi Miyoshi, Bisai; Yasuhiro Ishii, Gufu, both of Japan

[73] Assignee: Sanyo Electric Co. Ltd., Moriguchi, Japan

[21] Appl. No.: 275,813

[22] Filed: Jun. 24, 1981

Related U.S. Application Data

[60] Division of Ser. No. 190,416, Sep. 24, 1980, Pat. No. 4,308,094, which is a continuation of Ser. No. 32,730, Apr. 24, 1979, abandoned, which is a continuation-in-part of Ser. No. 873,614, Jan. 30, 1978, abandoned.

[30] Foreign Application Priority Data

Feb. 2, 1977 [JP] Japan ................................ 52-11913
Feb. 2, 1977 [JP] Japan ................................ 52-11914
Sep. 16, 1977 [JP] Japan ................................ 52-112329

[51] Int. Cl.[3] ............................................ B32B 27/14

[52] U.S. Cl. .................................... 428/198; 428/206; 428/209; 428/288; 428/326; 428/367; 428/379; 428/393; 428/408; 428/457; 428/902

[58] Field of Search ............... 428/195, 198, 206, 209, 428/288, 326, 367, 379, 393, 408, 457, 902

[56] References Cited

U.S. PATENT DOCUMENTS

| | | | |
|---|---|---|---|
| 4,112,168 | 9/1978 | Schafft | 428/288 |
| 4,132,828 | 1/1979 | Nakamura et al. | 428/367 |
| 4,169,911 | 10/1979 | Yoshida et al. | 428/288 |
| 4,347,104 | 8/1982 | Dressler | 428/408 |

*Primary Examiner*—James J. Bell
*Attorney, Agent, or Firm*—Darby & Darby

[57] ABSTRACT

A diaphragm for a speaker formed of a mixture of carbon fiber, pulp and polyvinyl alcohol fiber as a binder with a thermosetting resin on the diaphragm base on which a metal film is provided in the interstices between fibers and on the entire fiber surface.

8 Claims, 12 Drawing Figures

DIAPHRAGM FOR SPEAKER

This application is a division of our prior copending application Ser. No. 190,416, filed Sept. 24, 1980, U.S. Pat. No. 4,308,094 which in turn was a continuation of then copending application Ser. No. 32,780 filed Apr. 24, 1979, now abandoned, which in turn was a continuation-in-part of U.S. patent application Ser. No. 873,614, filed Jan. 30, 1978, now abandoned, all of which applications are assigned to the same assignee.

BACKGROUND OF THE INVENTION

1. Field of the Invention

The present invention relates to a diaphragm for a speaker and a method of producing the same, and, more particularly, it relates to a speaker diaphragm improved in the material of which it is formed and in the bound or interlaced condition of said material in order to reproduce sound with high fidelity, and a method of producing the same.

2. Description of the Prior Art

In order to reproduce sound with high fidelity by a speaker, it is desirable that the diaphragm, which is the vibrating body of the speaker, be capable of vibrating in as wide a frequency range as possible. To this end, it is advantageous for the diaphragm to be light in weight and rigid. More specifically, the greater the ratio $E/\rho$, where E is Young's modulous and $\rho$ is density, the more advantageous. This is because the higher the rate of propagation of sound, $\sqrt{E/\rho}$, through the diaphragm material, the wider will be the frequency range of vibration.

For this reason, many attempts to increase the rate of propagation of sound, $\sqrt{E/\rho}$, through the diaphragm material by screen-processing a mixture of a highly elastic fiber, e.g., carbon fiber, metal fiber or inorganic fiber and a natural fiber, that is, pulp, in a manner similar to that employed for making paper, have heretofore been made. However, satisfactory results have not been obtained. This is because the existing diaphragms produced in this way suffer deterioration of the speaker frequency characteristics, especially a decrease in the output sound pressure level in the treble, or high, frequency range.

A prior art reference of interest in relation to this invention may be found in Japanese Patent Publication No. 23505/1970, "Radio Cone", published on Aug 7, 1970. Therein is disclosed a speaker cone produced by cutting carbon filaments into short fibers, mixing the latter with pulp having a binder, such as polyvinyl acetate resin, added thereto, and screen-processing said mixture in a manner similar to that employed for making paper. Since the carbon fiber used therein is, in itself, highly elastic, it might seem to be capable of increasing the rate of propagation of sound through the diaphragm material. On the contrary, since it is highly elastic, the fibers rub each other during vibration, so that the interlaced carbon fibers will become loose in prolonged use, thus leading to deterioration of the characteristics. More specifically, the use of a binder, such as polyvinyl acetate resin used therein, alone fails to produce a sufficient force for binding fibers together to provide a structure having the fibers firmly bound together. This also results in failing to provide sufficient rigidity required for a diaphragm. Therefore, the speaker cone disclosed therein, as such, can hardly be used as a speaker diaphragm and there would be much room for improvement.

Another prior art publication of interest in relation to this invention may be found in Japanese Laying-Open No. 63912/1975, "Diaphragm for Electro-Acoustic Transducer" laid open on May 30, 1975. Therein is disclosed a diaphragm comprising a layer-like body of electrically conductive fiber, such as carbon fiber or metal fiber, having at least one surface thereof formed with a metal layer by electroplating. According to this disclosure, since the surface of the fiber assembly constituting the diaphragm is plate with a metal layer, the binding of fibers at least on the surface of the diaphragm can be attained. But in the interior of the diaphragm, the binding of fibers is still weak, so that the resulting structure has its fibers loosely bound together as a whole. Further, the rigidity in the interior of the diaphragm is also insufficient. This is due to the fact that the metal plating layer is formed by electroplating. The art disclosed therein also has the disadvantages inherent in electroplating. One of the disadvantages is low productivity. More specifically, the necessity of placing electrodes opposed to a diaphragm to be plated limits the number of diaphragms which can be plated in each operation. Further, in order to form a plating surface of good quality, it is necessary to prepare an electrode extending along the shape of the cone-shaped diaphragm. Even with this, however, it is impossible to preclude a phenomenon in which a thicker plating layer is formed on the peripheral edge of the diaphragm. Another disadvantage of electroplating is that a restriction of being electrically conductive is imposed on the material to be plated. Therefore, the freedom of selection of materials for making diaphragms is decreased.

SUMMARY OF THE INVENTION

This invention solves the various problems of the prior art described above.

A speaker diaphragm according to the present invention is obtained by forming a diaphragm base composed mainly of carbon fiber by screen-processing in a manner similar to that employed for making paper, and applying electroless plating treatment thereto to deposit a metal film in the cross-points between the inner fibers of the diaphragm base and on the entire fiber surface. Preferaby, in the above screen-processing step, polyvinyl alcohol fiber is added as a binder so that it is dissolved in the water existing therearound or in the wet atmosphere in the drying phase of the screen-processing step. Thus, the polyvinyl alcohol fiber permeates into the cross-points between the inner fibers, and upon completion of the drying phase, the polyvinyl alcohol fiber advantageously acts as a binder for binding the fibers together. More preferaby, a thermosetting resin is deposited on the diaphragm base treated with the binder as described above. Thus, the diaphragm base is rendered heat-resistant, water-resistant and chemical-resistant and the shortage of the binding force by which the fibers constituting the diaphragm base are bound together is compensated to the extent which does not result in an increase in density. Therefore, in a preferred embodiment of the invention, electroless plating treatment is applied to the diaphragm base on which said thermosetting resin has been deposited, whereby a metal film is deposited on the surface of the thermosetting resin layer, achieving the binding of fibers.

In another preferred embodiment, said polyvinyl alcohol fiber is not used at all in the process. For this reason, subsequent to the addition of a thermosetting resin, hot press shaping is performed, thereby achieving both the thermal setting of the thermosetting resin and the increase of the fiber density.

Accordingly, a principal object of the invention is to provide a speaker diaphragm which is light in weight and rigid, and a method of producing the same.

Another object of the invention is to provide a speaker diaphragm whose component fibers are firmly bound together, and a method of producing the same.

A further object of the invention is to provide a speaker diaphragm which can be mass-produced, and a method of producing the same.

Another object of the invention is to provide a speaker diaphragm having a structure such that materials suitable for use as a speaker diaphragm can be freely selected and the superior properties of such materials can be fully developed, and a method of producing the same.

These and other objects and features of the invention will become more apparent from the following detailed description, when taken in conjunction with the accompanying drawings:

DESCRIPTION OF THE PREFERRED EMBODIMENTS

Figure 1A:
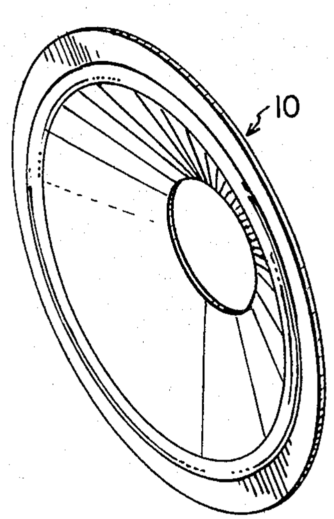
FIG. 1A is a perspective view of a speaker diaphragm.
Figure 1C:
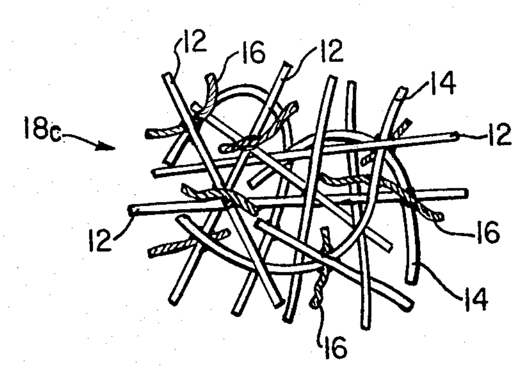
FIGS. 1C through 1F are enlarged illustrative views of a portion of the materials in some steps shown in FIG. 1.

FIG. 1A is a perspective view of a speaker diaphragm 10, made in accordance with the invention. The diaphragm is of generally conical shape, although any other suitable shape can be utilized. The diaphragm can be used in a conventional speaker, the details of which are not shown.

A first feature of a preferred embodiment of this invention to be described herein is that the diaphragm contains a natural fiber and carbon fiber which has a Young's modulus of 3,000–15,000 kg/mm$^2$ and that the proportions by weight of said natural fiber and carbon fiber are set such that the former is 10–50% and the latter is 90–50%, thereby achieving the improvement of response characteristics in the treble which cannot be attained by a conventional carbon fiber-containing diaphragm.

When highly elastic carbon fiber whose Young's modulus is above 15,000 kg/mm$^2$ is used, a diaphragm base obtained by screen-processing a mixture of said carbon fiber and other fibers, such as pulp, in a manner similar to that employed for making paper tends to be bulky and its density tends to decrease as the carbon fiber content increases. However, such bulky and low-density diaphragm is considerably decreased in the number of points of binding of fibers and in the interlacing effect, so that despite the use of carbon fiber, the Young's modulus of the diaphragm itself decreases and hence it is impossible to expect a great increase in the rate of propagation of sound, $\sqrt{E/\rho}$, through the diaphragm.

In contrast, as in this embodiment, by using carbon fiber having a relatively low Young's modulus of 3,000–15,000 kg/mm$^2$ and setting the carbon fiber content at 90–50%, it is possible to sufficiently increase the rate of propagation of sound, $\sqrt{E/\rho}$, without making the diaphragm bulky.

Another feature of this embodiment is described in the following.

The diaphragm base obtained by carrying out the screen-processing step as described above is then subjected to electroless plating so that all the fibers constituting the diaphragm base are bound together by metal.

Generally, a diaphragm made by using highly elastic fiber such as carbon fiber lacks the fiber-binding force and the interlacing effect, so that it is usual with such diaphragm to be unable to fully develop the effect of using highly elastic fiber. In contrast thereto, according to this embodiment, the electroless plating applied to the diaphragm base increases the fiber-binding force and the rate of propagation of sound, $\sqrt{E/\rho}$. Further, when electroless plating is used to effect the binding of fibers, unlike the case of electroplating, the wetting effect due to the use of a suitable surface active agent causes the plating liquid to enter even the narrow spaces between fibers. Thus, this is superior in that metal can be uniformly deposited not only on the surface layer but also in the cross-points between the inner fibers of the diaphragm base so that the fibers can be firmly bound. This means that the increase in the density $\rho$ can be prevented by avoiding superfluous metal deposition.

The electroless plating used in the present invention is a kind of chemical plating and refers to a method of depositing a metal by making use of the oxidation-reduction reaction of ions in a solution without applying an electric field, unlike the so-called electroplating which effects the deposition of a metal by applying an electric field from the outside.

As for the metals for plating, those having high specific elasticity, such as nickel, cobalt and chromium, are preferable. In addition, when electroless chromium plating is to be effected, this is preceded, e.g., by electroless flash-plating of nickel to form an electrically conductive film.

The steps of producing a diaphragm in this embodiment are shown in flow chart form in FIG. 1B and will now be described in detail.

Figure 1D:
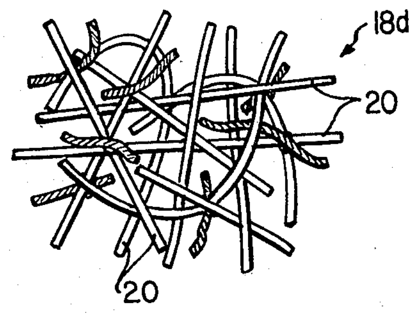
Figure 1E:
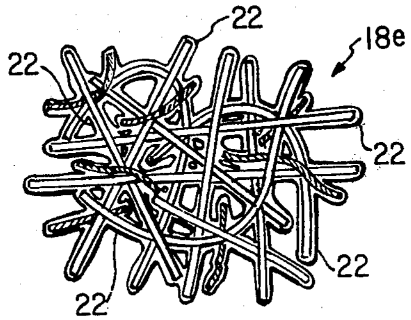
Figure 1F:
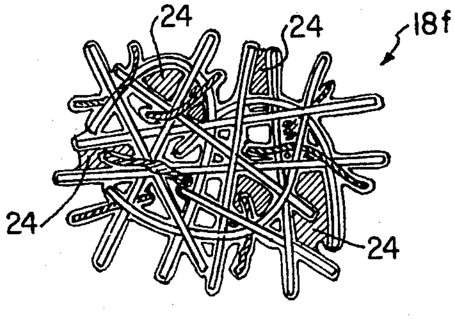
Figure 1B:
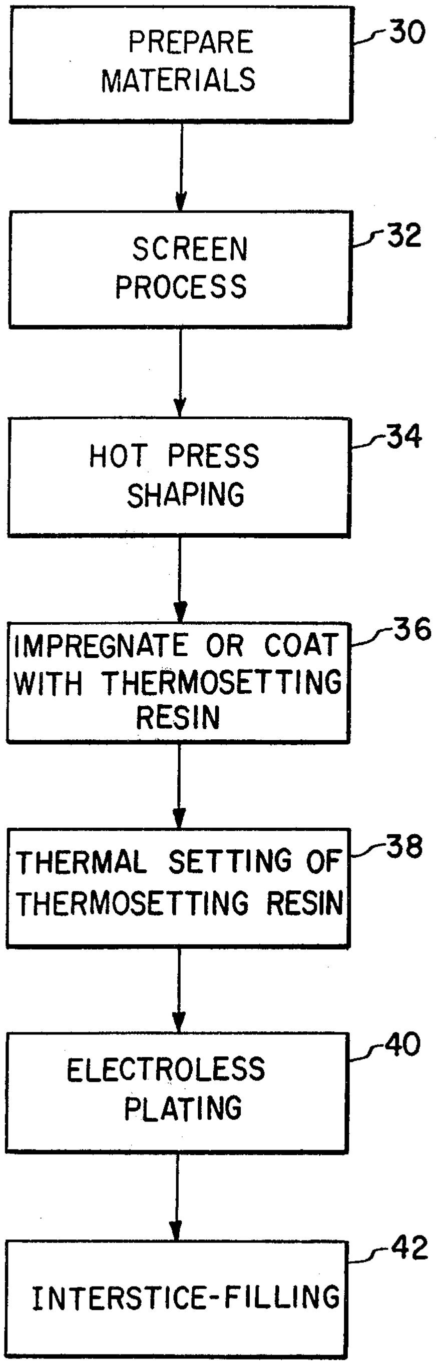
FIG. 1B is a flow chart showing a method of production according to an embodiment of the invention.

FIGS. 1C through 1F are enlarged illustrative views of a portion of the materials in some steps shown in FIG. 1B. FIGS. 1C through 1F show one and the same portion to give a better understanding of a material newly added somewhere in the course extending from FIG. 1C to FIG. 1F or of the processing involved.

As indicated by a block 30 of FIG. 1B, carbon fiber, pulp and polyvinyl alcohol fiber (PVA fiber) are prepared as raw materials. Carbon fiber which has a Young's modulus of 3,000–15,000 kg/mm$^2$ is preferable, and such carbon fiber is cut into about 3 mm-long pieces, while the polyvinyl alcohol fiber is also cut into about 3 mm-long pieces. As for pulp, kraft pulp is used. As will be later described, the polyvinyl alcohol fiber acts as a binder for the diaphragm, and in a heat-shaping process (block 34) subsequent to the screen-processing (block 32), it is dissolved in water and when completely dried it exhibits a binding effect.

The proportions by weight of carbon fiber and pulp are preferably such that the former is 90–50% and the latter is 10–50%. The proportion of polyvinyl alcohol fiber relative to the total weight of the diaphragm base is preferably in the range of 5–35%. If it is below 5%, then the binding effect is decreased and the diaphragm becomes bulky, decreasing the rate of propagation of sound $\sqrt{E/\rho}$. If it is above 35%, then the diaphragm base tends to bulge during the heat-shaping and the rate of propagation of sound, $\sqrt{E/\rho}$, is again decreased.

The raw materials are prepared in the above proportions by weight and mixed together and the mixture is dispersed in water. In this connection, if a very small amount, about 0.1 g/10 l, of a dispersant, such as sodium polyacrylic acid is added, the dispersibility of the fibers is improved.

The above-mentioned mixed liquid is screen-processed on a paper making machine (block 32 of FIG. 1B). This screen processing takes about 10 seconds to produce each sheet.

The sheets thus produced are then subjected to hot press shaping (block 34 of FIG. 1B) to provide diaphragm bases. A portion of such diaphragm base 18*c* is shown on an enlarged scale in FIG. 1C, in which it is seen that carbon fiber 12, pulp 14 and PVA fiber 16 are entwined around each other. Particularly, the PVA fiber 16 is partly melted at points of contact with the other fibers to produce a binding effect. In addition, the density of each fiber in this state is high.

Figure 1G:
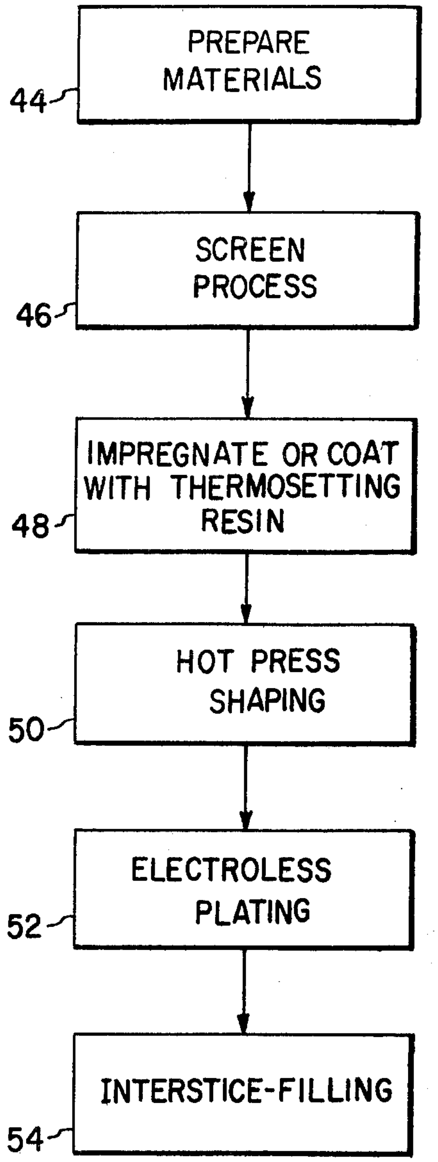
FIG. 1G is a flow chart showing a method of production according to another embodiment of the invention.
Figure 1H:
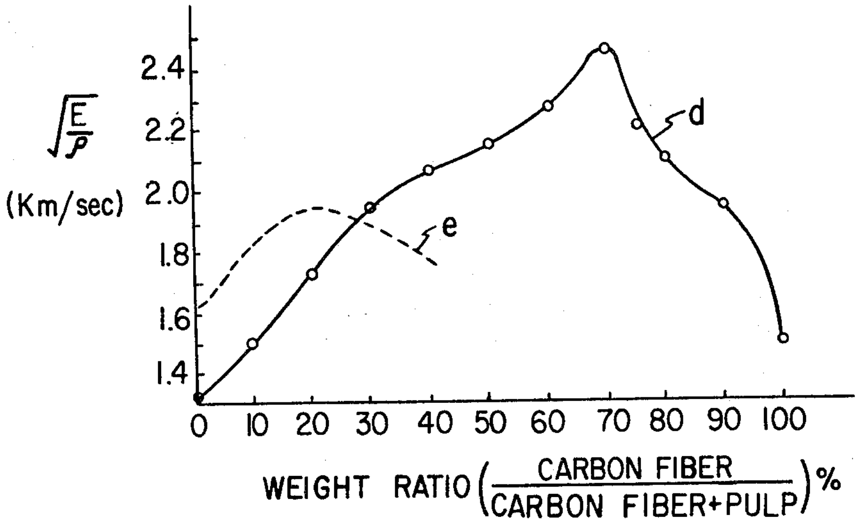
FIG. 1H is a graph showing the relation between the amount of carbon fiber relative to the amount of pulp and the rate of propagation of sound through the diaphragm material afer the screen-processing step.

FIG. 1H shows the relation between the amount of carbon fiber and the rate of propagation of sound, $\sqrt{E/\rho}$ through a diaphragm. The solid-line curve (d) shown therein refers to the use of carbon fiber whose Young's modulus is 10,000 kg/mm$^2$ and whose diameter is about 5$\mu$, which carbon fiber was cut into 3–5 mm-long pieces, which were then mixed with kraft pulp in various mixing ratios, said mixtures being screen-processed as usual and pressed under the same conditions to provide diaphragms and the rate of propagation of sound, $\sqrt{E/\rho}$, through each diaphragm was measured by a forced vibration reed method. The horizontal axis indicates the carbon fiber content, in terms of a proportion by weight relative to the kraft pulp content. As can be seen in this graph, the rate of propagation of sound, $\sqrt{E/\rho}$, is above 1.95 km/sec when the carbon fiber content is 30–50%, 2.17 km/sec when it is 52–77% and 2.4–2.5 km/sec when it is 66–72%.

In addition, when highly elastic carbon fiber whose Young's modulus is above 15,000 kg/mm$^2$ is used, optimum results can be obtained when the carbon fiber content is 10–30%, as shown in broken line (curve (e) in FIG. 1H. Even in that case, however, the rate of propagation of sound, $\sqrt{E/\rho}$, is 1.94 km/sec at most, the differences being clear also from FIG. 1H.

Figure 2:
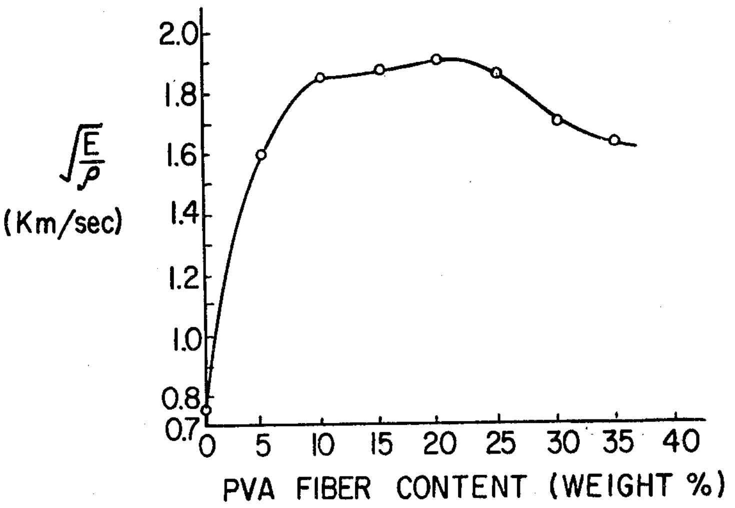
FIG. 2 is a graph showing the relation between the ratio of the polyvinyl alcohol fiber content to the total weight of the diaphragm and the rate of propagation of sound through the diaphragm material after the screen-processing step.

FIG. 2 shows the relation between the amount of polyvinyl alcohol (PVA) fiber which serves as a binder for the diaphragm, relative to the total weight of the diaphragm base, and the rate of propagation of sound, $\sqrt{E/\rho}$, through the diaphragm base. The raw fiber material of the diaphragm used in this measurement comprises carbon fiber and kraft pulp and the proportions by weight thereof are such that the former is 70% and the latter is 30%. As can be seen in this graph, the PVA fiber content is preferably 5–35%, more preferably 7–28% and most preferably 10–25%, and when it is about 20%, the rate of propagation $\sqrt{E/\rho}$ is at the peak.

As indicated by block 36 of FIG. 1B, the diaphragm base obtained in the step of block 24 is, for example, impregnated with a solution of thermosetting resin to deposit this resin on the diaphragm base 18*c*. As indicated by block 38 of FIG. 1B, the thermosetting resin thus deposited is heated for setting. The structure of the diaphragm base resulting from this step is shown in FIG. 1D. The diaphragm base 18*d* shown in FIG. 1D has the thermosetting resin 20 deposited thereon to cover the entire fiber surface. In addition, the thickness of the deposited thermosetting resin 20 is as small as less than 0.1 microns. Therefore, the interstices between the fibers remain unfilled. This thermal setting step 38 is performed, for example, at 180° C. for 1 hour.

The step of depositing such thermosetting resin is carried out for the purpose of rendering the diaphragm base heat-resistant, water-resistant and chemical-resistant in view of an electroless plating treatment which is effected in the subsequent third step and for making up for the shortage of the fiber binding force. Therefore, the resin to be deposited should be heat-resistant, water-resistant and chemical-resistant and highly elastic. In this connection, it is of vital importance that said thermosetting resin should allow the propagation of sound therethrough at a higher rate than through said diaphragm base. This is because if such condition is not satisfied, it is impossible to provide an increased rate of propagation of sound through the finally resulting diaphragm. This is based on the fact that the measurement by the known forced vibration reed method of the rate of propagation of sound through different small samples prepared by mixing different kinds of highly elastic fiber with pulp, screen-processing the mixtures by the conventional method using a water-soluble binder to form diaphragm bases, depositing a fixed amount (stated specifically, 5% based on the weight of the diaphragm base) of different synthetic resins and heating them for drying, has revealed that when a resin which allows the propagation of sound therethrough at a higher rate than through said diaphragm base is used, there is observed an increase in said rate, but that when a resin through which the rate of propagation of sound is lower is used, the rate of propagation of sound through the resulting diaphragm base is decreased.

For a diaphragm base composed mainly of carbon fiber with pulp added thereto, the resins which allow the higher rates of propagation of sound include melamine resin, phenol resin, urea resin, unsaturated polyester resins, alkyd resin and silicone resin.

These resins are thermosetting resins and are highly water-resistant and chemical-resistant, so that they can withstand the electroless plating treatment applied in the subsequent step (block 40 in FIG. 1B).

Figure 3:
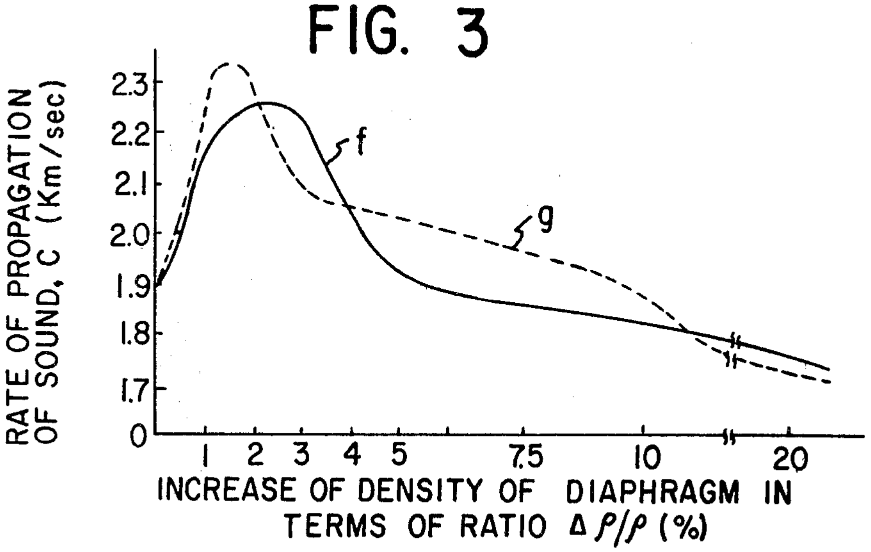
FIG. 3 is a graph showing the influence of the deposited amount of highly elastic resin on the rate of propagation of sound through the diaphragm material.

The amount of said thermosetting resin deposited on the diaphragm base is preferably 1-10% and more preferably 1-5% based on the weight of the diaphragm base. If said amount is below the lower limit, the fiber binding force is insufficient, whereas if it is above the upper limit, the fiber binding force is increased, but the rate of propagation of sound through the diaphragm is decreased. FIG. 3 shows the effect produced by the deposition of such thermosetting resin. The solid line curve in this graph (f) refers to the deposition of phenol resin, while the broken line curve (g) refers to the deposition of unsaturated polyester resin. The vertical axis indicates the rate of propagation of sound, C or $\sqrt{E/\rho}$, and the horizontal axis indicates the increase of the density of the diaphragm, in terms of the ratio $\Delta\rho/\rho$, i.e., the amount of resin deposited. In addition, the diaphragm tested comprises 60 parts of carbon fiber and 40 parts of pulp.

In addition, the deposition of said thermosetting resin is performed by impregnating or coating the diaphragm base 18*c* (FIG. 1C), after the screening, with a solution of thermosetting resin or by pressing it.

The diaphragm base then enters into a step indicated by block 40 of FIG. 1B. In this step, the diaphragm base 18*c* having the thermosetting resin deposited thereon as described above is subjected to electroless plating. The thus obtained diaphragm base 18*e* is shown in FIG. 1E, in which it is seen that the deposited metal 22 covers the entire fiber surface. It is to be particularly noted that the metal has such a form as to firmly bind the fibers together at points of contact between the fibers.

The above described electroless plating is superior in the ease of control of the rate of deposition of metal, the adhesion of metal to an object to be plated, and the stability of the deposited film. As for the electroless plating, the conventional method is used which comprises a degreasing treatment, a sensitivity improving treatment, and an activating treatment, followed by immersion in a plating solution. With electroless plating, the rate of deposition can be controlled to a great extent by the composition of the plating solution, the bath temperature and the pH. Among the suitable deposition metals are nickel, chromium, cobalt and tungsten.

Figure 4:
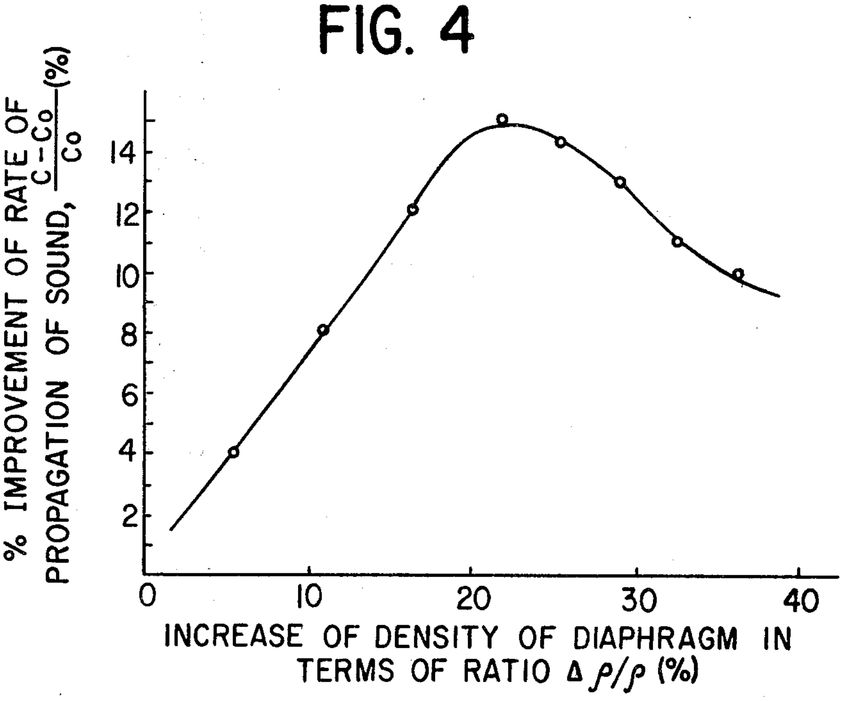
FIG. 4 is a graph showing the increase of the rate of propagation of sound through the diaphragm material relative to increments of the density of the diaphragm brought about by the deposition of nickel.

It is of vital importance that the amount of metal on the diaphragm base by plating should be in the range of 12-36% of the weight of the diaphragm base. If the said amount is below 12%, the resulting fiber-binding force is insufficient and if it is above 36%, this adds little to the binding force and leads to the increase of density, thus decreasing the rate of propagation of sound, $\sqrt{E/\rho}$, through the diaphragm. FIG. 4 shows such plating deposition effect. The deposition metal, however, is nickel by the electroless plating method. The horizontal axis indicates the increase of density of the diaphragm, i.e., the amount of nickel deposited, and the vertical axis indicates the amount of increase of the rate of propagation of sound after treatment C′, over the rate of propagation of sound before treatment $C_O$, divided by the rate of propagation of sound before treatment, $C_O$, i.e., $[(C'-C_O)/C_O]$ (percentage improvement of the rate of propagation of sound), with respect to the amount of nickel deposited. In addition, the diaphragms tested were prepared by impregnating diaphragm bases comprising 70 parts of carbon fiber, 30 parts of pulp and 10 parts of PVA fiber with a solution of 5% phenol resin, heating them for setting, and subjecting them to electroless plating. As can be seen in FIG. 4, the deposition of a metal film in the interstices between fibers increases the fiber-binding force and hence the rate of propagation of sound, $\sqrt{E/\rho}$. That is, when the amount of metal deposited on the diaphragm base by plating is 12-36%, the percentage improvement of the rate of propagation of sound is above 10%; when it is 13-31%, the said improvement is above 12%; and when it is 20-26%, the said improvement is about 14.5-15%.

The diaphragm base 18*e* obtained in the manner described above is shown in FIG. 1E as if it had relatively high permeability. However, FIG. 1E, as well as other figures, is greatly enlarged. With this fact taken into consideration, it will be seen that the permeability of the diaphragm base 18*e* is not such as to make the diaphragm unusable and that, therefore, said permeability is not to the degree that it should be prohibited from being imparted to such diaphragm. Therefore, the diaphragm base 18*e*, as it is, will encounter no problem as to its permeability and is usable as such. However, an interstice-filling treatment to be presently described may be easily carried out. In addition, it should be repeatedly pointed out that such interstice-filling treatment is not an essential requisite of the present invention.

The interstice-filling treatment, indicated by a block 42 of FIG. 1B, is performed by impregnating the diaphragm base 18*e* (FIG. 1E), for example, with a solution comprising 5 g of acetylcellulose (or nitrocellulose), 80 ml of ethyl alcohol and 20 ml of acetone. Subsequent to this impregnation, it is allowed to dry naturally. FIG. 1F shows the diaphragm base 18*f* which has been subjected to said interstice-filling treatment. As shown in FIG. 1F, interstice-filling films (for example, acetylcellulose films) 24 are so formed as to provide very thin films in the meshes formed between fibers. That is, when the diaphragm base is immersed in said interstice-filling solution and then taken out therefrom, the interstice-filling films 24 are in a state in which they are stretched thinly in the meshes between fibers by the surface tension of the liquid, the films being then allowed to dry while substantially maintaining such state. Thus, the interstice-filling films 24 act to reduce said permeability.

The reason for using cellulose resin as described above is that even a diluted solution obtained by dissolving a very small amount of cellulose resin has a high capability of forming film and that, therefore, it is possible to fill the interstices without substantially increasing the weight of the diaphragm. Other resins have no such capability.

The process shown in FIG. 1B described so far is superior in mass production. This is believed to be due to the use of PVA fiber. However, PVA fiber is low in heat-resistance and water-resistance and may cause a decrease in the rate of propagation $\sqrt{E/\rho}$. In some cases, therefore, it would be more preferable not to use PVA fiber. A method which does not use PVA fiber will be described below.

FIG. 1G is a flow chart showing another method of producing speaker diaphragms. In a step indicated by a block 44, carbon fiber and pulp are prepared as raw materials. This step is followed by a screen step indicated by a block 46. A diaphragm base obtained in this screen step is bulky owing to the spring-back of the carbon fiber. As indicated by block 48, the deposition of a thermosetting resin is then performed, for example, by impregnation or spraying. Hot press shaping is then performed, as indicated by a block 50. In this hot press shaping, the density of fibers in the diaphragm is increased and at the same time the thermosetting resin is thermally set. When this hot press shaping step 50 is completed, the state of the diaphragm base is the same as that of the diaphragm base 18*d* of FIG. 1D described above except that it does not contain PVA fiber. As in the block 40 and 42 of FIG. 1B described above, electroless plating as indicated by a block 52 is applied, followed by interstice-filling as indicated by a block 54.

The method outlined above does not use PVA fiber and instead it performs hot press shaping to achieve two objects at the same time, namely, heating the thermosetting resin and increasing the fiber density.

The non-use of PVA fiber, as compared with the previously described method, is expected to improve the characteristics of the diaphragm exemplified by the rate of propagation $\sqrt{E/\rho}$.

In order to preclude misunderstanding which might arise in connection with the result shown in FIG. 2, a supplementary description of FIG. 2 will be given. In FIG. 2, the samples used have undergone only screening and hot press shaping. Therefore, in the case where the PVA fiber content of a sample is zero, this means that the sample has no binding means incorporated therein. Accordingly, this sample is bulky owing to the spring back of the carbon fiber and exhibits an extremely low value for the rate of propagation $\sqrt{E/\rho}$. It should be understood, therefore, that the process involved in FIG. 2 is different from the process shown in FIG. 1G.

Concrete examples of the present invention will be described below.

70 parts of carbon fiber with a diameter of 5μ and a Young's modulus of 10,000 kg/mm$^2$, cut into 3–5 mm-long pieces, 30 parts of kraft pulp and 20 parts of polyvinyl alcohol fiber cut into 3 mm-long pieces were mixed together, with a small amount, about 0.1 g/10 l, of sodium polyacrylic acid added thereto, the mixture being heat-shaped to provide a cone-shaped diaphragm base.

Such diaphragm was then subjected to a treatment for deposition of highly elastic resin thereon. That is, said diaphragm was immersed in a solution comprising:

phenolformaldehyde resin—3 parts
setting agent—0.3 parts
methanol—96.7 parts and the resin deposited was heated at 180° C. for one hour for setting.

Subsequently, the said diaphragm base having phenol resin deposited thereon was subjected to electroless nickel plating to deposit nickel thereon. Thus, an alkali degreasing treatment and an acid degreasing treatment were carried out to remove oils from the diaphgram. The alkali solution comprised 4 g/l sodium hydroxide, 20 g/l sodium carbonate, and 40 g/l sodium dihydrogenphosphate, and in order to improve the wettability of the diaphragm base, 0.5 g/l of sodium-di-n-octylsulfosuccinic acid (trade name, Aerosol-OT) was added, the bath temperature being 50–60° C. The subsequent acid treatment was carried out at room temperature by using 100 ml/l of sulfuric acid and 0.5 g/l of Aerosol-OT. Next, a sensitivity improving treatment was carried out. The treating liquid was composed of 10 g/l of stannous chloride ($SnCl_2.2H_2O$), 50 ml/l of chloric acid, 40 ml/l of iso-propyl alcohol and 0.5 g/l of Aerosol-OT, the liquid being at room temperature. The sensitivity improving treatment was followed by the activating treatment. The liquid used was composed of 0.25 g/l of palladium chloride ($PdCl_2$), 10 ml/l of chloric acid, 40 ml/l of iso-propyl alcohol and 0.5 g/l of Aerosol-OT, the pH of the liquid being adjusted to 4.5 with aqueous ammonia, the bath temperature being 60° C. The diaphragm base was immersed in this liquid. The activating treatment is followed by a pre-immersion treatment. The liquid used was composed of 50 g/l of sodium hypophosphite and was at room temperature. All the above pre-treatments were followed by washing with water. Finally, nickel plating was carried out, and the composition of the treating liquid and the treating condition were as follows:

Nickel chloride—15 g/l
Sodium hypophosphite—26 g/l
Succinic acid-2-sodium—20 g/l
DL-lactic acid (72% solution)—20 ml/l
Propionic acid—1.8 ml/l
Thiourea—0.5 mg/l
Bath temperature, 80° C.±2° C.—pH=6.5–7.0
Plating time, 2 minutes Under these conditions, electroless nickel plating was carried out to deposit nickel on the entire surfaces of the carbon fiber and pulp fiber constituting the diaphragm and on the entire surfaces of the junction, thereby increasing the fiber-binding force and the interlacing effect. In this way, a satisfactory diaphragm base was obtained.

Various properties of such diaphragm (3) are shown in the following table, in comparison with a diaphragm (2) with the electroless nickel plating treatment omitted in the above example and a diaphragm (3) after screen-processed with both the electroless nickel plating treatment and the phenol resin depositing treatment omitted.

| Diaphragm | Density (g/cm$^3$) | Rate of propagation of sound $\sqrt{E/\rho}$ (Km/sec) | Young's modulus (Kg/mm$^2$) |
|---|---|---|---|
| (1) Screen-processed cone (no treatment) | 0.220 | 2.30 | 116 |
| (2) Phenol, resin, deposition treatment only | 0.240 | 2.50 | 150 |
| (3) Nickel plating | 0.290 | 2.85 | 236 |

As shown in this table, the diaphragm (3), as compared with the diaphragms (1) and (2), allows the propagation of sound therethrough at a higher rate and increases Young's modulus, without greatly increasing the density, thus demonstrating that the electroless plating treatment is highly significant.

Figure 5:
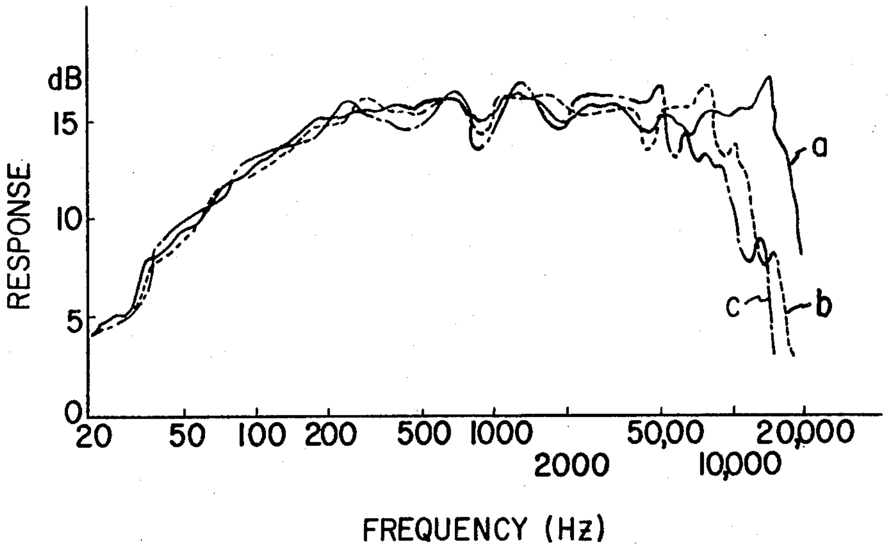
FIG. 5 is a graph showing the frequency characteristics of a speaker using the diaphragm of the invention, in comparison with the frequency characteristics of a speaker using a conventional diaphragm.

FIG. 5 shows the frequency characteristics of speakers using diaphragms thus produced. In this graph, the solid line curve (a) refers to a diaphragm obtained according to the method of the present invention; the broken line curve (b) refers to a diaphragm with the resin depositing treatment and electroless nickel plating treatment omitted; and the dot-dash line curve (c) refers to a diaphragm screen-processed using pulp alone. As can be seen also in this frequency characteristic graph, the superiority of the diaphragm (a) according to the present invention is outstanding.

In addition, as previously described, an interstice-filling treatment may be concomitantly performed subsequent to the electroless plating. Thus, the preferred embodiment of the present invention described above is only illustrative, and it should be understood that the scope of the invention is to be determined solely by the appended claims.

What is claimed is:

1. A speaker diaphragm comprising: a base formed of fibers of pulp and of carbon fibers, said carbon fibers comprising at least 50% by weight of the base, and a layer of electroless plated metal on said base which binds the fibers together at their intersections.

2. A diaphragm as in claim 1 wherein the base also contains fibers of a material for binding with the other fibers.

3. A diaphragm as in claim 1 further comprising a material filling the interstices between said metal plated fibers.

4. A diaphragm as in claim 1 wherein the carbon fiber comprises in the range of from about 50% to about 90% by weight of the base and the pulp is in the range of from about 50% to about 10% by weight of the base.

5. A diaphragm as in either of claim 4 wherein the base also contains fibers of a material for binding with the other fibers in the range of from about 5% to about 35% by weight of the base.

6. A diaphragm as in claim 1 wherein the base also contains in the range of from about 10% to about 35% weight of fibers of a material for binding with the carbon fibers.

7. A diaphragm as in claim 6 wherein the fibers of the binding material comprise polyvinyl alcohol fibers.

8. A speaker diaphragm comprising:

a base formed of carbon fibers which comprises at least 50% by weight of the base;

a layer of electroless plated metal on said base which binds the fibers together at their intersection; and a material filling the interstices between the said metal plated fibers.

* * * * *